INVENTORS.
Derek T. Turner
John E. Scheer
BY
Paul & Paul
ATTORNEYS.

INVENTORS.
Derek T. Turner
John E. Scheer
BY
Paul & Paul
ATTORNEYS.

United States Patent Office 3,708,387
Patented Jan. 2, 1973

3,708,387
METALLIC MODIFIED PLASTIC COMPOSITIONS AND METHOD FOR THE PREPARATION THEREOF
Derek T. Turner, Bryn Mawr, and John E. Scheer, Philadelphia, Pa., assignors to Drexel University, Philadelphia, Pa.
Filed Sept. 11, 1970, Ser. No. 71,570
Int. Cl. B32b 5/16
U.S. Cl. 161—168         4 Claims

ABSTRACT OF THE DISCLOSURE

Metallic modified plastic compositions are provided which are comprised of a plastic matrix consisting of adhered plastic particles having an average size from 20–1000 microns and at least 5% by volume of a conductive metal. The metal is dispersed throughout the plastic matrix in conductive paths in the interstices between the adhered plastic particles of the matrix. The metal particles have an average particle size which is at least about $1/10$ that of the plastic particles utilized to form the plastic matrix. The metallic modified plastics of this invention are especially useful as electrical conductors and are also useful in applications requiring plastics having high heat conductivity and mechanical strength.

BACKGROUND OF THE INVENTION (1) Field of the invention

This invention is concerned with metal modified plastic compositions and the method for manufacturing these compositions.

(2) Description of the prior art

Plastics, that is high molecular weight polymeric materials, are generally characterized by having very poor electrical and thermal conductivity. Because of their inherent electrical resistivity plastics are widely used as insulating materials and the like. Plastics, however, have many advantages, including being readily formed in relatively complex configurations, with close tolerances, by simple molding techniques, and the cost of parts made of plastic in comparison with parts made of corresponding materials such as metals is generally considerably lower. Plastics, however, cannot be used in certain applications because of their relatively high electrical resistivity, low thermal conductivity and relatively poor mechanical properties.

Many attempts have been made in the prior art to alter the inherent electrical characteristics of plastics from being that of a non-conductor to that of a conductor. It has been suggested to incorporate conductive materials in the plastic such as carbon, the noble metals, copper, copper alloys, aluminum and the like. The conductive materials were added in the form of wires, crystals, powders, mesh and various other forms. Using conventional molding techniques, a blend of plastic and the conductive material was heated above the melting point of the plastic and molded into the desired shape. Using these molding techniques, the compositions had to contain rather large amounts of conductive materials, for example, 25–40% by volume or even higher amounts, in order to obtain a substantial improvement in the conductivity of the final product. The use of these large amounts of conductive materials in the plastic compositions had several rather distinct disadvantages. Initially, the conductive materials, for example, copper or silver, cost substantially more than plastics which significantly increases the cost of the final plastic composition. In addition, the use of large amounts of the conductive materials often significantly decrease the desirable properties of the plastic material such as the moldability and workability and even in certain instances causes a rather marked decrease in the physical properties of the final composite product. The physical properties, in fact, were often considerably less than that which would be expected by averaging the properties of each of the components of the composition.

One method which was employed which showed considerable merit, consisted of initially plating granules of the plastic material, for example, polystyrene granules, with thin layers of metals and then molding the coated granules under sufficient pressure that portions of the plated surfaces apparently ruptured allowing the plastic particles to fuse together into a unitary bimaterial mass. This method, however, was quite expensive because of the plurality of separate and somewhat complex steps involved.

In addition to increasing the electrical conductivity of plastics, it has also been attempted to increase the thermal conductivity. An improvement in the thermal conductivity of certain plastics would make them useful in a broader range of products and would inherently increase the temperature conditions under which plastic resins could be utilized. When metals are used for loading the plastics, they do have an effect on increasing the thermal conductivity but the increase in thermal conductivity, is almost directly proportional to the increase in electrical conductivity. Accordingly, in order to gain a significant increase in the thermal conductivity, it was heretofore necessary to also include in the compositions the relatively large amounts of metals noted above for increasing the electrical conductivity. These large amounts of metals adversely affect the physical properties of the plastics, especially the strength, which compromised the advantages obtained in thermal stability by the addition of the metal.

It is an object of this invention to overcome the aforementioned problems and disadvantages of the prior art.

It is a still further object of this invention to provide a plastic composition with improved thermal and electrical conductivity.

It is a more specific object of this invention to provide a plastic composition having a relatively low percentage of conductive material and high electrical and thermal conductive properties.

It is a further object of this invention to provide a process for the manufacturer of highly conductive metallic plastic compositions.

Other objects and advantages of this invention will become further apparent from a review of the attached drawings and a continued reading of the specification and subjoined claims.

SUMMARY OF THE INVENTION

The objects of this invention have been achieved by providing a plastic composition containing about 90–95% by volume of a matrix comprised of sintered plastic particles having an average individual particle size of from 20–1000 microns and from about 5–10% by volume of a finely divided conductive metal or metal alloy having an average particle size which is at least $1/10$ the average particle size of the particles comprising the plastic matrix. The metallic component of the composition is distributed in conductive paths through the matrix of the plastic material in the interstices between the plastic particles. The plastic compositions of this invention are advantageously manufactured by physically mixing the plastic particles with the metal particles and then sintering the plastic particles by heating and compressing the uniformly mixed materials.

DESCRIPTION OF THE PREFERRED EMBODIMENTS

Figure 1:
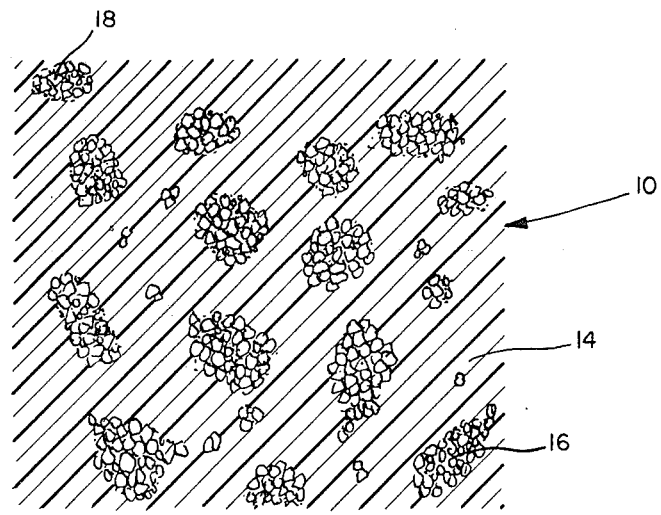
FIG. 1 is an illustration in cross section of a typical conductive composition of the prior art having continuous plastic phase and isolated metal containing zones.
Figure 2:
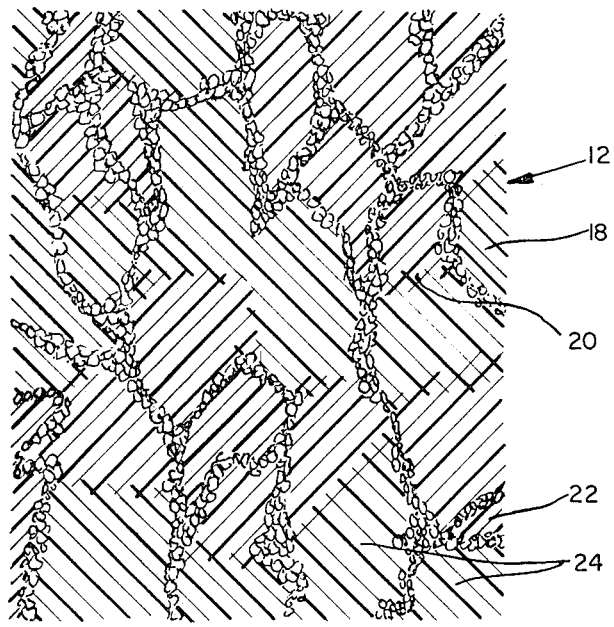
FIG. 2 is an illustration in partial cross section of a conductive plastic of the present invention.

The plastics which are employed to manufacture the conductive compositions of this invention are high molecular weight polymers. The plastics which are utilized may be either thermal-setting or thermal-plastic in nature. The plastic compositions which are used in the present invention are characterized by being solids at the temperature at which the mixing with the metallic particles is to take place and being capable of being sintered into a coherent mass without becoming fluid and losing their particle identity. The thermal-setting resins which are utilized in the present invention are generally in an advanced B stage, that is, they are almost fully cured and are in a solid state. The thermal-setting resins must be capable of being converted into the C stage i.e., the fully cured state, without the resin particles melting into a liquid prior to fully curing. The thermal-setting resins which are most preferably used in this invention are for example, the urea-formaldehydes, phenol formaldehyde, melamine formaldehydes and epoxy resins.

In the practice of this invention, thermoplastic resins are most preferably employed. There are many distinct advantages to using thermoplastics in the compositions of this invention as compared to the use of the thermal-setting resins. There is a considerably greater degree of control over the sintering process because of the thermoplastic characteristic properties of these resins. The thermoplastic resins are likewise simpler to mold into finished articles than most thermal-setting resins and certain problems such as too rapid curing which may cause blistering or only partial curing which may cause dimensional instability are not encountered with the thermoplastic resins. The particular type of thermoplastic resins that are employed in this invention can be selected from a broad class of materials such as the polyesters of various dihydric alcohols and terephthalic acid such as polyethylene terephthalate, the various acrylic resins including the acrylates, methacrylates and various combinations and copolymers thereof, polyamides such as nylon 6, nylon 66, nylon 610 and so forth and the polyolefins such as polyethylene and polypropylene. Plastic materials having both a combination of excellent lubricity and conductivity can be obtained by using certain fluorocarbon resins such as polytetrafluoroethylene in the compositions of this invention. A class of polymers which have proven to be especially useful are the polyvinyl chlorides. There are, of course, various other thermoplastic resins which may be employed in the process of this invention without departing from the spirit or scope of this invention and even with regard to the thermoplastic resins specifically noted above, it should be appreciated that within each type there are various modifications possible such as varying the molecular weight and so forth which can be used to obtain a given polymer having certain predetermined properties such as molecular weight, glass transition temperature, melting point and the like. It is also possible to use mixtures of different polymers in the compositions of this invention.

The polymer that is used in the composition of this invention is prepared so that the average particle size is from 20–1000 microns and more preferably 100–500 microns. The polymer may be prepared in this particular size by precipitation techniques or by mechanically reducing the particle size to this given range.

The conductive materials that are used in the compositions of this invention are preferably highly conductive metals or metal alloys. The metals which are preferably utilized are for example, copper, nickel, aluminum and the noble metals, in particular, silver. The metals should be used in as pure a form as possible and should be free from surface oxidation which can inhibit the conductivity of the metals. In addition, in the process of this invention, it is highly advantageous to conduct the process in a non-oxidizing atmosphere in order to maintain the purity of the metals employed. The metals can be in the form of crystals, flakes, whiskers or the like. The size of the metal particle is very important relative to the size of the particles utilized to make the plastic matrix. The finer the particle size of the plastic material which is utilized to form the plastic matrix, the finer should be the initial particle size of the metal. Optimum results are obtained when the average particle size of the metal particles is at least about $1/10$ the average particle size of the plastic material employed.

The compositions of this invention in addition to containing the plastic materials and metal or metal alloys noted above may in addition contain additives such as pigments, fillers, mold release agents and the like.

The components comprising the compositions of this invention are initially blended together by any suitable means in order to obtain a uniform mixture of materials. Various methods can be used such as rotary mills, tumblers, ball mills and the like or even mixed on a laboratory scale using a stirring rod and a beaker.

The uniformly blended mixture is then heated at a sufficient temperature and pressure to cause the individual particles of the plastic material to sinter together to form a continuous matrix. It should be carefully noted however, that the temperature and pressure are carefully monitored and maintained at a sufficiently low range that the individual particles do not lose their structural identity. The process temperature, T, is maintained within a range greater than the glass transition temperature of the plastic, $T_g$, but lower than the melting point $T_m$ of the plastic. The pressure employed must be sufficient to compact the mixture so as to obtain a strong adherent plastic matrix having a relatively low porosity. In general, the closer the temperature is maintained to the glass transition temperature of the plastic material, the higher the pressure must be in order to obtain a given density and strength in the final product. However, even at temperatures approaching the melting point of the plastic material, significant pressure must still be applied to insure that fusion occurs at the interfaces of the adjacent plastic particles.

It should be carefully noted that the plastic material is not permitted to melt. When the plastic material is formed as noted above, the metal particles remain in approximately the same position obtained during the initial mixing. In the final adhered mixture the metal particles are in the interstices between the adhered plastic particle matrix. If a sufficient amount of metal is present in the composition, the metal will form continuous conductive paths through the plastic material. On the other hand, if the plastic material is heated above its melting point, the plastic will flow. The liquid plastic being in a different physical phase than the metal is believed, when pressure is applied, to cause the metal to become segregated in large clusters of metallic particles each insulated from the other by the plastic phase. This flow of the plastic is believed to prevent the formation of conductive paths. It has been found as a result of both the segregation effect and the insulating effect, that considerably higher amounts of metals must be added to obtain conductive plastic compositions. As noted above, it has heretofore been necessary to employ about 25–40% or more by volume of metal particles in order to obtain a significant amount of conductivity in the product.

The difference in structure can readily be seen by microscopically examining samples prepared in accordance with the process of the prior art 10 and samples prepared in accordance with the process of this invention 12. In the prior art samples, the plastic 14 is in a continuous phase. Large, but relatively isolated areas contain the metal particles 16. These areas 16 are effectively insulated by the plastic materials 14 so that conductive paths are not set up through the plastic matrix unless large amounts of metal are added. The compositions of this invention 12, as opposed to the prior art compositions, are sintered together at their interfaces 20. However, the plastic particles 18 still retain their structural identity. The metal particles 22 are arranged in rather continuous paths throughout the plastic matrix 24. When this material 12 is examined with a stereo microscope, it can be seen that the metal particles 22 in the compositions of this invention, when viewed in three dimensions, form continuous paths throughout the plastic matrix 24. Since the plastic is not allowed to rise above its melting point, the metal particles 22 are neither isolated nor insulated by fluid plastic materials. It has been found that at a 6% loading of metal that each metal particle has between 1.42 and 1.55 contacts with other metal particles to form continuous paths through the plastic matrix.

If a sufficient amount of metal is added to the composition and the relative size of the plastic particles to the size of the metal particles is in a given ratio, continuous conductive paths will form through the matrix 24. In general, at least 5% by volume of the total mixture should be comprised of the metal particle with the metal particles having a size at least $\frac{1}{10}$ the size of the plastic particles for thermal conductivity and about 6% by volume for electrical conductivity. The required amount of metal will vary depending upon the metal employed and and the required degree of conductivity desired in the final product. In general, larger volumes of the lower conductivity metals are required in order to obtain an equivalent conductivity as when metals of a high conductivity such as silver are employed in the compositions of this invention. It is preferable to use as fine metal particles as possible since this does have a definite effect of increasing the possibility of forming conductive paths through the plastic matrix. The average particle size should be, as noted above, at least $\frac{1}{10}$ the average particle size of the plastic particles employed. Preferably, however, it should be considerably less, for example, excellent results have been obtained with metallic particles having a size which was approximately $\frac{1}{25}$ the size of the plastic particles comprising the matrix.

It has been found in utilizing the process of this invention that the electrical resistance of plastics such as polyvinyl chloride can be easily reduced from the relatively high resistivity of about $10^{15}$ $\Omega$cm. to less than $10^{-1}$ $\Omega$cm. This amounts to almost a complete change in the electrical conductivity characteristics of the material from a non-conductor to a conductor.

It has been found that in addition to completely changing the electrical characteristics of the final product that the metal containing product can be more easily machined. The thermal conductivity properties are likewise substantially increased.

What was highly surprising was that the inclusion of metals in the plastic matrix for example, 5–8% of nickel in accordance with the process of this invention resulted in a substantial increase in the mechanical properties. Both the transverse rupture strength and the impact strength were almost doubled. What was even more surprising was the almost direct relationship between the amount of metal in the polymer matrix and the abrupt increase in the electrical, thermal and mechanical increase in the properties of the materials. The mechanical properties of the materials abruptly changed in the volume loading range of 5–8% nickel. At approximately the same volume loading range, the electrical and thermal conductivity likewise abruptly increased. Additional amounts of the metal however, did not have a corresponding increase but to the contrary there was a tendency for a slight tapering off with increased amounts of metals being added to the compositions. The reason for the increase in the electrical conductivity and the heat conductivity is rather obvious because of the continuous paths of metal formed through the plastic matrix. However, the effect of the additional minor amounts of the metals on the mechanical properties is not completely understood. It is believed, however, that the metal particles cause a degree of separation between the crystalline phases of the plastic material so as to limit the extent of ruptures through the entire composition. In a non-filled plastic, the rupture once started would tend to be further propagated through the unfilled plastic rather than being interrupted by the interface formed by the metal particle layers through the structure.

Figure 3:
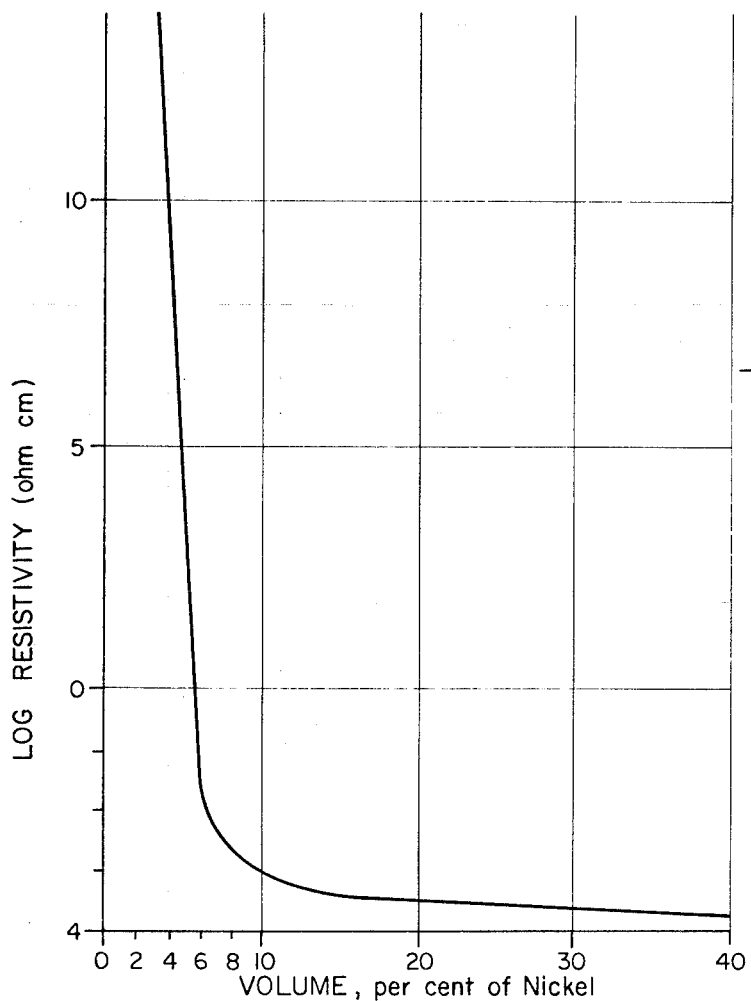
FIG. 3 is a graphic illustration of the effect of the addition of nickel to polyvinylchloride in accordance with the process of this invention on electrical conductivity.
Figure 4:
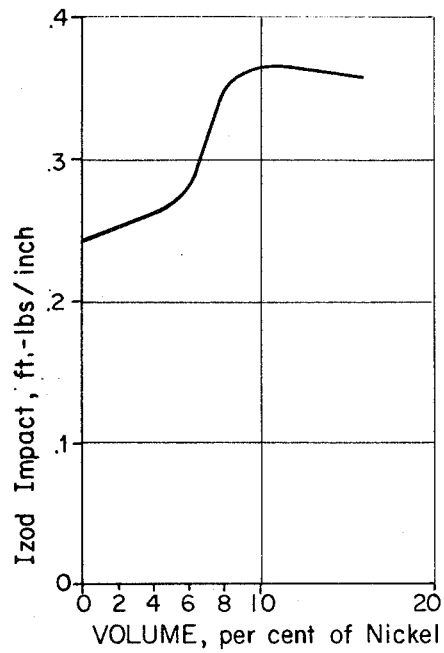
FIG. 4 is a graphic illustration of the effect on the Izod impact strength of adding nickel to polyvinylchloride in accordance with the teachings of this invention.
Figure 5:
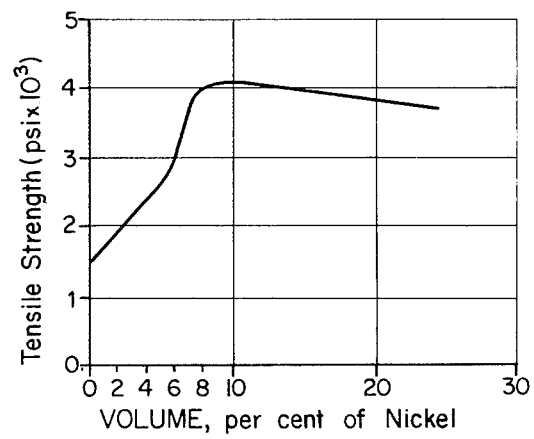
FIG. 5 is a graphic illustration of the effect on the tensile strength of adding nickel to polyvinylchloride.

The highly unexpected improvement in the properties of the metallic modified composition of this invention can be seen by reference to the graphs in FIGS. 3, 4 and 5. In FIG. 3, it can be seen when the volume loading of nickel in polyvinyl chloride was increased to about 6%, there was a sudden change in the electrical resistivity. There was a more gradual decrease in the resistivity from about 6 to about 10% with a general tapering off occurring after 10%. The preferred upper limit with regard to the results obtained is about 10% by volume.

The effect on the impact strength (see FIG. 4) is about the same as the effect on the resistivity except that the rapid change in impact strength was obtained with between 5 and 10% by volume of nickel. There was a slight decline in the impact strength above 10% volume of loading.

The effect of the metal addition in tensile strength was about the same as the impact strength shown in FIG. 5. The optimum results were obtained in the range of 5–8% by volume with a tapering of tensile strength occurring with increases above 8% by volume.

The particular volume loading selected, to some extent, is dependent on the desired properties required in the final composition. However, it should be noted that the optimum combination of properties is obtained with regard to electrical and thermal conductivity and mechanical properties when 6–10% and even more preferably, 6–8% by volume loading of the metal is used.

The following examples are given by way of further illustration of the present invention and are not intended to limit in any way the scope of the subjoined claims.

EXAMPLE 1

A number of metallic modified samples were prepared using polyvinylchloride as the resin matrix and nickel as the metallic additive. The PVC was unplasticized but contained initiator fragments and suspending agents left over from the polymerization reaction. The polyvinyl chloride had the particle distribution of 0% 40 to 80 mesh, 20% 80 to 100 mesh (180 to 150$\mu$), 70% 100 to 200 mesh (150 to 75$\mu$), 10% 200 mesh (75$\mu$).

The weight average molecular weight=100,000; number average molecular weight=58,000; bulk density was 0.48 g./cc.; specific gravity was 1.40; glass transition temperature, $T_g$ was 76° C. A precise estimate of the melting temperature of crystalline regions in the polymer was not available but the melting point was near 190° C. The compacted polymer had an electrical resistivity of $>10^{14}$ $\Omega$cm.

The nickel used was uniform spike equiaxis grains having an average particle size of 4–7$\mu$.

Measured volumes of PVC and the nickel powder were thoroughly mixed for one half hour in a rotary blender at room temperature. The mixture was compacted in a cavity mold for 10 minutes at 120–130° C. under a pressure of 10,000 p.s.i. The mold was then allowed to cool to room temperature and the cylindrical compact removed: Dimensions, length 1.3 in., diameter 2 cm. Density measurements indicated that this procedure provided samples of porosity 1.5%.

Measurements of electrical resistivity were made at 25° C. using the Van der Pauw technique on discs of thickness 0.05 cm. which were cut from the cylindrical compacts. For contacts were made to the perimeter of the disc across two perpendicular lines. The resistivity, $\rho$, was calculated from the equation $$\rho = \frac{\pi d v}{\ln 2 i}$$

where $v$ is the potential drop between two adjacent contacts when the current flowing between the remaining to the contacts $i$; $d$ is the thickness of the disc.

Sections for microscopic examination were mounted in polymethyl methacrylate and polished to a $0.1\mu$ finish. Examination of reflected light revealed the metallic particles as white features against a black continuous background of PVC. Evidence that the samples were homogenous from one plane to another was provided by estimation of the volume fraction of metal by quantitative metallography; in every case estimates were within 2% by volume of the made-up values.

In some cases thin wafers, ca. $40\mu$, were examined with transmitted light under a stereoscopic microscope. This permitted observation of metallic particles below the surface and revealed the presence of continuous three-dimensional networks of metallic particles, for volume loadings in excess of ca. 6%.

Preliminary experiments showed that a volume loading nickel as low as 6% markedly reduces electrical resistivity. The decrease in resistivity with increasing loading of nickel is shown in FIG. 3. The mechanical properties are shown in FIGS. 4 and 5.

EXAMPLE 2

Example 1 was repeated with the exception that copper was employed in place of nickel and equivalent results were obtained. The electrical resistivity markedly changed at 6% volume loading.

EXAMPLE 3

Example 1 was repeated with aluminum. Initial samples showed poor results. However, when the process was conducted in a nitrogen atmosphere, excellent results were obtained. The samples that failed were carefully examined and it was found that the surfaces of the aluminum had oxidized providing an insulating coating on the aluminum particles.

EXAMPLE 4

Example 1 was repeated with the exception that polyethylene terephthalate, nylon 6, and polyethylene powders of about the same particle size distribution were used in place of polyvinyl chloride. Appropriate adjustments were made for glass transition temperatures of each material. The samples were evaluated and each was found to have substantially improved electrical and mechanical properties of the same order as that encountered with PVC in Example 1.

What is claimed is:

1. The composition of matter comprised of 92–95% by volume of a sintered matrix of plastic particles having an average particle size of from 20–1000 microns and about 5–8% by volume of conductive nickel particles having a particle size at least $\frac{1}{10}$ the average particle size of said plastic particles comprising said matrix, said conductive metal particles being distributed in conductive paths throughout said matrix whereby a conductive plastic composition of matter is obtained.

2. The composition according to claim 1 wherein said plastic is a thermoplastic material.

3. The composition according to claim 1 wherein said plastics have an average particle size of between 100 and 500 microns.

4. The process for the manufacture of the composition according to claim 1 comprising the steps of blending together about 92–95% by volume of plastic particles having an average particle size of 20–1000 microns and 5–8% of conductive nickel particles having an average particle size of at least $\frac{1}{10}$ the particle size of said plastic particles; heating the resulting mixture to a temperature above the glass transition temperature and below the melting point of said plastic particles; and applying sufficient pressure to said mixture to cause the plastic particles in said mixture to be sintered together into a continuous plastic matrix whereby a conductive plastic composition is obtained having a continuous plastic particle matrix having conductive paths of said nickel particles distributed throughout said matrix.

References Cited

UNITED STATES PATENTS

| | | | |
|---|---|---|---|
| 3,260,576 | 7/1966 | Gruene et al. | 75—212 |
| 2,806,509 | 9/1957 | Bozzacco et al. | 161—5 |
| 2,985,411 | 5/1961 | Madden | 161—5 |
| 3,161,919 | 12/1964 | Renaud | 161—214 |
| 3,483,074 | 12/1969 | Squitieri et al. | 161—218 |

MORRIS SUSSMAN, Primary Examiner

U.S. Cl. X.R.

264—122, 111; 75—212; 29—182.5; 161—216

UNITED STATES PATENT OFFICE
CERTIFICATE OF CORRECTION

Patent No. 3,708,387      Dated January 2, 1973

Inventor(s) Derek T. Turner and John E. Scheer

It is certified that error appears in the above-identified patent and that said Letters Patent are hereby corrected as shown below:

Column 7, line 20, before "contacts", delete --to the-- and insert therefor --two--; and after "contacts", insert --is--.

Signed and sealed this 22nd day of May 1973.

(SEAL)
Attest:

EDWARD M. FLETCHER, JR.
Attesting Officer

ROBERT GOTTSCHALK
Commissioner of Patents